United States Patent [19]

Brett

[11] 4,251,171
[45] Feb. 17, 1981

[54] DRILLING ACCESSORY

[76] Inventor: Colin E. P. Brett, 11701 First St. East, Suite 8, Treasure Island, Fla. 33706

[21] Appl. No.: 928,555

[22] Filed: Jul. 27, 1978

[51] Int. Cl.² .................................................. B23B 47/00
[52] U.S. Cl. ...................................... 408/67; 51/268; 125/20
[58] Field of Search ................ 408/241 G, 67, 72 R, 408/710; 145/116 A; 125/20; 51/268; 409/134

[56] References Cited

U.S. PATENT DOCUMENTS

| 3,339,435 | 9/1967 | Heitz | 408/67 |
| 3,787,138 | 1/1974 | Vernon et al. | 145/116 A |
| 3,837,383 | 9/1974 | Ko | 408/67 |
| 3,936,213 | 2/1976 | Kappel | 408/72 R X |

Primary Examiner—Gil Weidenfeld
Attorney, Agent, or Firm—Nims, Howes, Collison & Isner

[57] ABSTRACT

A drilling accessory for collecting dust and other debris when drilling a hole in a workpiece. The accessory having a handle for hand holding the device and a hollow open ended dust collector attached to the handle. One end of the dust collector is provided with a split rubber cover spanning the interior of the dust collector through which cover a drill bit may be inserted to engage the workpiece to be drilled. When a forward end of the dust collector is placed adjacent the workpiece to be drilled, and drilling commenced, dust and other debris resulting from drilling will be collected and held inside the dust collector.

5 Claims, 3 Drawing Figures

DRILLING ACCESSORY

BACKGROUND OF INVENTION

This invention relates to a hand held drill accessory or device for collecting drillings when a hole is being drilled in a workpiece.

Dust collectors have been used with hand operated drills to collect dust, chips and other debris resulting during drilling operations. These devices all include enclosures surrounding the drill bit for collecting the dust caused by drilling. However, all of these dust collectors are mounted directly to the drill. Some of the dust collectors have enclosures which rotate with the drill bit, for example, U.S. Pat. Nos. 3,339,435; 3,881,838 and 3,936,213. Others have enclosures which are stationary while the drill bit rotates, for example, U.S. Pat. Nos. 2,828,108; 3,536,149 and 3,583,821. Since these dust collectors are mounted and secured to the drill, care must be taken to mount the collector properly. Furthermore, it is cumbersome and time-consuming to mount these collectors and then remove them when a different drill bit is to be inserted or when it is desired not to use the accessory.

SUMMARY OF THE INVENTION

The present invention overcomes the disadvantages of these conventional devices by providing a drilling accessory which is hand held and can be conveniently used to collect dust and debris caused during drilling operations.

A handle is provided for hand holding a hollow open ended cylindrical dust collector which has an open rearward end mounted in a bore extending through the handle. Also mounted in the bore in the handle is a flexible cover having cross slits or a star slit. This cover is mounted to span the end of the dust collector to provide a chamber within the dust collector open at the forward end (the end opposite the handle), for collecting the dust resulting from a drilling operation.

To use the hand held accessory, a user places the forward end of the dust collector in abutting relation with the workpiece to be drilled and inserts a drill bit through the bore in the handle, the slits in the cover, the cylindrical dust collector to engage the workpiece. As drilling is commenced, chips and other debris are collected in the chamber within the dust collector.

BRIEF DESCRIPTION OF THE DRAWINGS

In order that the invention may be clearly understood and readily carried into effect, a preferred embodiment will now be described, by way of example only, with reference to the accompanying drawings wherein.

DESCRIPTION OF A PREFERRED EMBODIMENT

Figure 1:
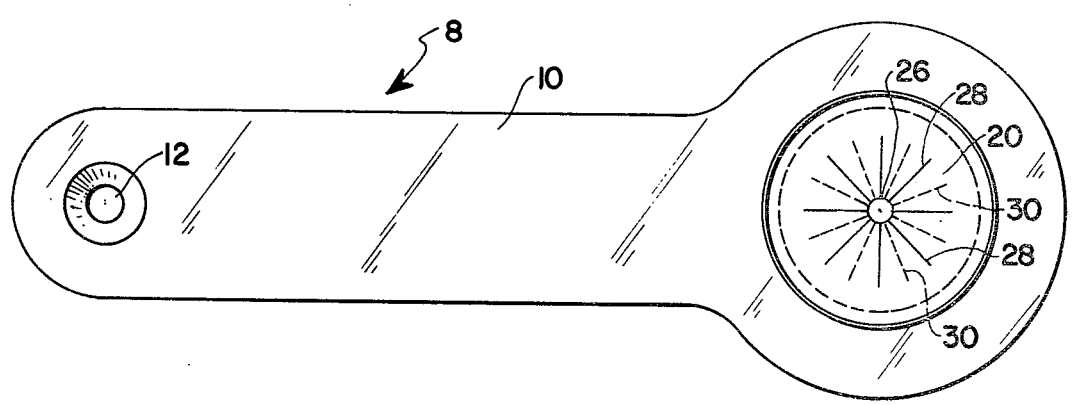
FIG. 1 is a plan view of the drilling accessory according to the present invention.
Figure 2:
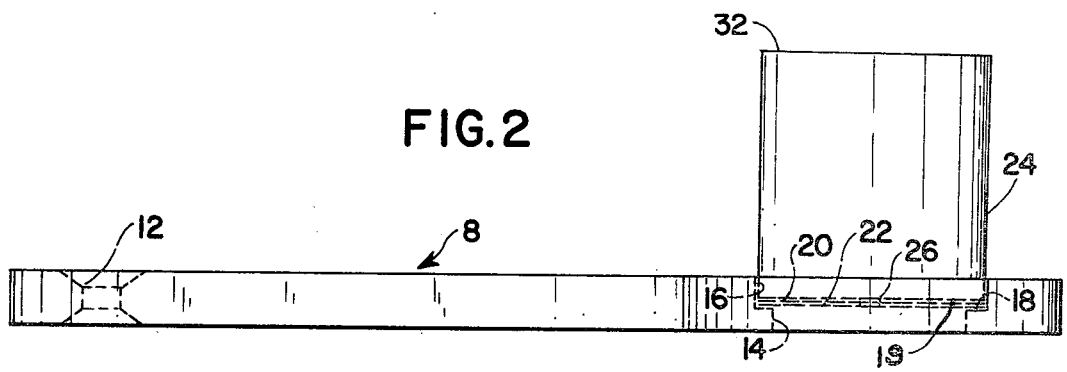
FIG. 2 is a profile view of the drilling accessory as shown in FIG. 1.

The drilling accessory shown in FIGS. 1 and 2 includes a handle 10 having a countersunk bore 12 for hanging the accessory when not in use. The handle 10 has a bore 14 in communication with a bore 16 of large diameter.

A step 18 is formed where the two bores 14 and 16 are joined. A cover preferably formed of two flexible discs 20, 22 such as rubber is placed on the step 18 and secured in place by an adhesive. The diameter of each disc 20, 22 has a diameter smaller than the diameter of bore 16 but larger than the diameter of bore 14 so that the cover may be set on the step 18.

A hollow cylindrical dust collector 24 open at both ends having an outside diameter smaller than bore 16 but larger than bore 14 is also placed on step 18 with rearward end 19 over the two flexible discs 20, 22 and secured in bore 16 by an adhesive. Thus the hollow cylindrical dust collector 24 will hold the two flexible discs 20, 22 in place.

The flexible discs 20, 22 are each provided with a common center hole 26 and each have offset star cuts 28 and 30 respectively.

Figure 3:
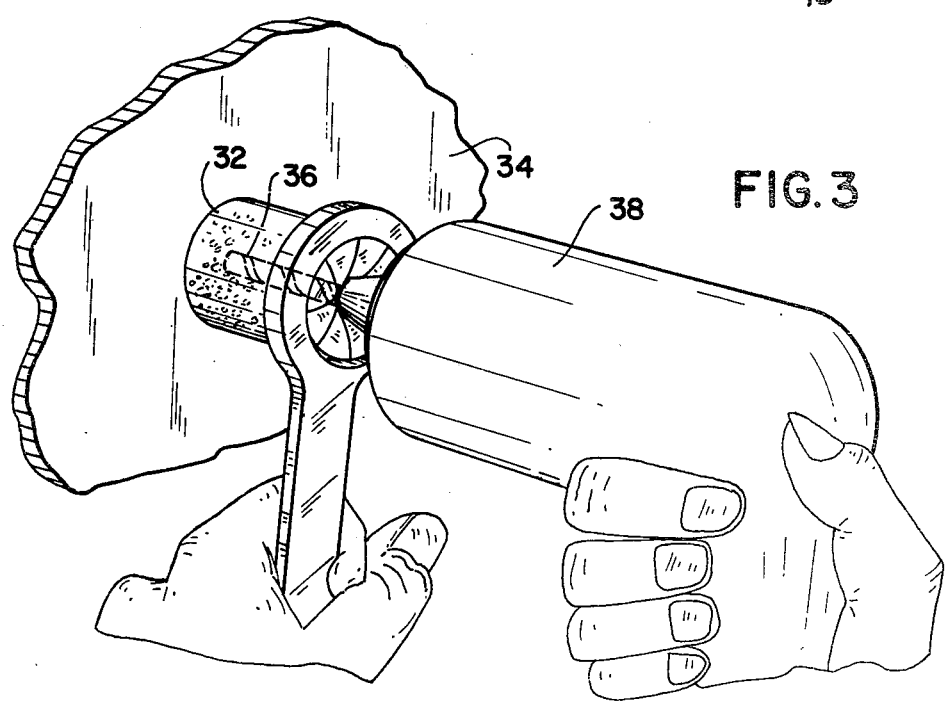
FIG. 3 is a perspective view of the drilling accessory in use.

To use the drilling accessory, a user by means of handle 10 positions a forward open end 32 of the hollow cylindrical dust collector 24 in abutting relation with the workpiece 34 to be drilled as shown in FIG. 3. A drill bit 36 held by drill 38 is inserted through hole 26 and star slits 28 and 30 to engage the workpiece 34. The drill bit 36 and drilling accessory are then positioned so that the drill bit 36 is in the desired position. Preferably, the hollow cylindrical dust collector 24 is constructed of a transparent material to enable the user to easily position the drill bit where a hole is to be drilled.

When drilling is commenced the resulting dust, chips and other debris is collected within the chamber formed by the workpiece 34, the walls of hollow cylindrical dust collector 24 and the flexible discs 20, 22.

While the fundamental novel features of the invention have been shown and described, it should be understood that various substitutions, modifications and variations may be made by those skilled in the art without departing from the spirit or scope of the invention. Accordingly, all such modifications and variations are included in the scope of the invention as defined by the following claims.

I claim:

1. A portable drilling accessory for use with a hand held drill when drilling a hole in a workpiece comprising:
   a handle;
   a hollow dust collector mounted to the handle and having an open forward end and an open rearward end aligned with the forward end, the forward end being positionable in abutting relation with the workpiece;
   a cover having an opening therein through which a drill bit may be inserted to engage the workpiece, the cover being mounted to span the interior of the hollow dust collector in spaced apart relation with the forward end, said cover comprising multiple layers of flexible material and the opening comprising a centrally located star cut in each layer which is offset from the star cut in an adjacent layer;
   whereby when the forward end is placed in abutting relation with the workpiece to be drilled and a drill bit inserted through the rearward end of the hollow dust collector, the opening in the cover and the forward end to engage the workpiece and drilling commenced, dust will be collected in the interior of the hollow dust collector between the cover and the workpiece.

2. A drilling accessory for use with a drill when drilling a hole in a workpiece comprising:

a handle having two transverse bores longitudinally aligned and in communication with one another, one bore having a larger diameter than the other whereby a step is formed where the two bores are joined;

a disc shaped cover having an opening therein through which a drill bit may be inserted to engage the workpiece, the cover having a diameter smaller than the bore of larger diameter and larger than the bore of smaller diameter, the cover being placed on the step between the larger bore and the smaller bore in the handle;

a hollow cylindrical dust collector having an open forward end and an open rearward end, the hollow cylindrical dust collector having an outside diameter smaller than the bore of larger diameter but larger than the bore of smaller diameter and having the rearward end mounted in the bore of larger diameter in the handle whereby the hollow cylindrical dust collector is mounted transversely to the handle, the rearward end of the hollow cylindrical dust collector being positioned to hold the cover between the rearward end and the step and the forward end of the hollow cylindrical dust collector being positionable in abutting relation with the workpiece to be drilled;

whereby when the forward end of the hollow cylindrical dust collector is positioned adjacent the workpiece and a drill bit is inserted through the opening in the cover and through the hollow cylindrical dust collector to engage the workpiece and drilling commenced, dust will be collected within the hollow cylindrical dust collector between the cover and the workpiece.

3. The drilling accessory according to claim 2 wherein the cover is constructed of flexible material and wherein the opening comprises a centrally located star cut.

4. The drilling accessory according to claim 2 wherein the cover comprises multiple layers of flexible material and the opening comprises a centrally located star cut in each layer which is offset from the star cut in an adjacent layer.

5. The drilling accessory according to claim 2 wherein the hollow cylindrical dust collector is constructed of transparent material.

* * * * *